United States Patent [19]

Nastjukha et al.

[11] 3,739,227
[45] June 12, 1973

[54] GAS-DISCHARGE SWITCHING DEVICE

[76] Inventors: Alexandr Ivanovich Nastjukha, ulitsa Raspeltina, 11, kv. 15; Oleg Georgievich Bespalov, Smolenskaya naberezhnaya 2, kv. 65; Andrei Serafimovich Knyazyatov, ulitsa Rogova, 5, kv. 131; Pavel Alexandrovich Smirnov, B. Cherkizovskaya, 10, korpus 1, kv. 7; Alexandr Nikolaevich Udovenko, ulitsa Rogova, 4, korpus 10, kv. 1, all of Moscow, U.S.S.R.

[22] Filed: June 5, 1972

[21] Appl. No.: 259,952

[52] U.S. Cl. ............... 315/338, 313/161, 313/162, 313/204, 313/217
[51] Int. Cl. .............................................. H01j 17/14
[58] Field of Search ........................ 315/334, 338; 313/204, 217, 161, 162

[56] References Cited

UNITED STATES PATENTS 2,728,006  12/1955  Webster ......................... 313/217 X Primary Examiner—Roy Lake
Assistant Examiner—James B. Mullins
Attorney—John C. Holman and Marvin R. Stern

[57] ABSTRACT

A gas-discharge switching device comprising: a hollow cathode in the form a closed chamber; a barrier dividing the above-mentioned chamber so as to form at least two discharge chambers; at least two anodes each of which is arranged within each of the discharge chambers: a means for arc firing.

2 Claims, 3 Drawing Figures

GAS-DISCHARGE SWITCHING DEVICE

This invention relates to the field of electrical engineering and more particularly to gas-discharge switching devices.

Known in the present state of the art are gas-discharge switching devices with a hollow cold cathode in the form of a closed chamber and with the anode placed inside the above-mentioned chamber, such devices being used in various experimental physical and industrial installations. At currents over 100 kA and pulse durations shorter than 100 to 200 microseconds, these known devices lose their property of unidirectional conductivity. However, in cases where unidirectional conductivity is not essential, i.e., under oscillatory-discharge duty conditions, known devices are capable of switching 5-kV currents as high as 300 to 350 kA. For example, gas-discharge switching devices are used under the above duty conditions in installations for forming and welding metal in an impulse magnetic field.

Experience acquired in the use of such devices in electric circuits of low inductance indicates that the maximum perimissible pulse current for normal service of the electrodes does not exceed 200 to 300 kA at a pulse duration of 20 to 100 microseconds. At current amplitudes exceeding the above values, the electrodes deteriorate rapidly, this being accompanied by excessive evolution of gases. As a result, the electric strength of the gas-discharge switching device worsens and its service life is shortened. Therefore, in cases when it becomes necessary to increase the current amplitude, recourse is made to parallel connection of the gas-discharge switching devices. Parallel connection not only lessens the current flowing through each of the devices, but is also advantageous in view of the fact that it lowers the total inductance of the parallel-connected devices. It should be noted, however, that parallel operation of several such devices calls for proper synchronization of their starting. This places more stringent requirements upon the firing facilities, requirements that are not always easily met. Moreover, the higher the frequency of the escillatory process of discharge, the smaller must be the scatter of firing of several parallel-connected gas-discharge switching devices.

Gas-discharge switching devices with a hollow cold cathode are fired by injecting the plasma of an auxiliary charge into the main discharge gap, this charge being produced in a special firing chamber or, alternatively, by means of an impulse magnetic field set up at short-time connection of a solenoid surrounding the cathode to a source of direct current.

A serious disadvantage of the above-mentioned firing facilities is the relatively wide spread of the arc-firing time of the gas-discharge switching device. Thus, on starting a switching device by plasma-injection, the spread amounts to 1 - 2 microseconds, and when firing the device by means of an impulse magnetic field, the spread is even wider and attains 5 to 10 microseconds. This disadvantage makes it impossible to resort to parallel connection of arc rectifiers in low-inductance circuits at current frequencies higher than 10 kc.p.s., since the considerable scatter of their firing leads to a significant distortion of the pulse waveform.

A primary object of the present invention is to provide a gas-discharge switching device of improved current-carrying capacity that can be used in lieu of parallel connection of several gas-discharge switching devices.

This object is accomplished by the development of a gas-discharge switching device filled with gas under a pressure corresponding to the left-hand branch of Paschen's curve, comprising a hollow cathode in the form of a closed discharge chamber, an anode placed inside the above-mentioned chamber, and a means for firing the arc discharge, the above chamber being — in accordance with the present invention — divided by a barrier into at least two discharge chambers, and the gas-discharge switching device being provided with at least one more anode arranged in such a manner that each of the discharge chambers contains the above-mentioned anodes.

It is advantageous to make the discharge chambers communicating between each other.

The above and other object, features and advantages of the present invention will be further described in detail by way of example with reference to the accompanying drawings in which.

Figure 1:
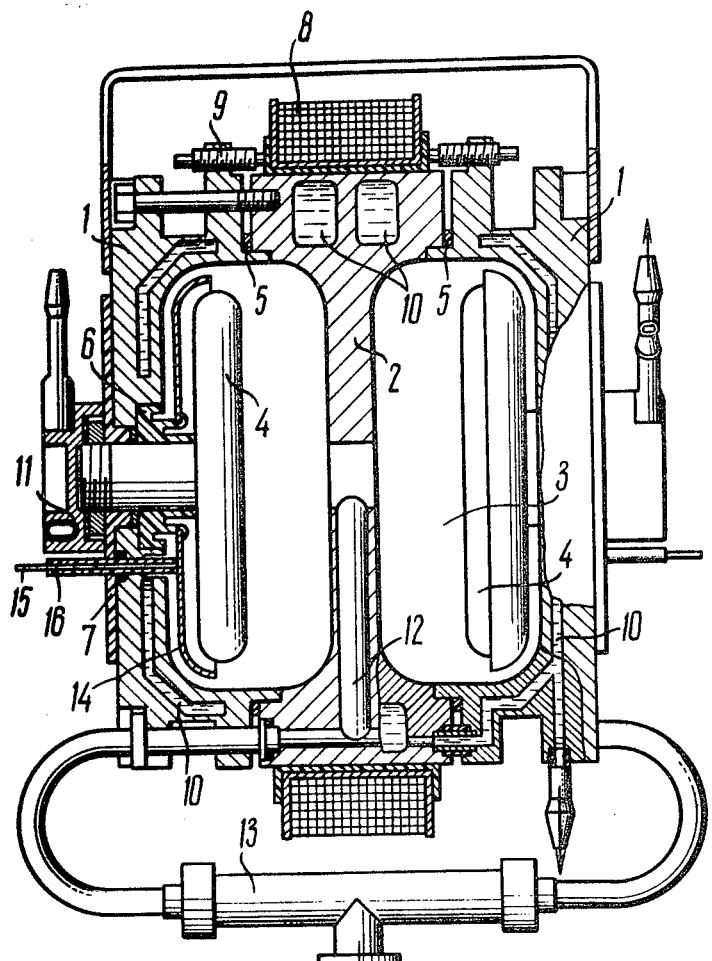
FIG. 1 is a general longitudinal sectional view of the hereindescribed gas-discharge switching device in accordance with the present invention.

The disclosed gas-discharge switching device comprises a hollow cathode formed by two metal casings 1 (FIG. 1) and a barrier 2. The barrier 2 divides the hollow cathode into two discharge chambers 3 that communicate with each other through a hole made in the barrier 2. The discharge chambers 3 contain metal anodes 4. The components of the hollow cathode — the casings 1 and the barrier 2 — are hermetically sealed together by means of packings 5. The anodes 4 are isolated from the cathode with the aid of insulators 6 and 7. The means for firing the discharge in the discharge chambers 3 consists of a solenoid 8 embracing the cathode and positioned in place by means of adjusting screws 9. The casings 1 and the barrier 2 are provided with communicating ducts 10 for cooling the cathode and the hollow current-supply terminals 11 of the anodes. The air is drawn out of the discharge chambers 3 through duct 12 provided in the barrier 2 and the collector 13 of the forevacuum pump (not shown in the drawing). A metal shield 14 is placed between the cathode casing 1 and the anode 4 for switching currents of 20 to 25-kV voltage. The distances of the anode 4 to the shield 14 and of the shield 14 to the cathode casing 1 are selected so that the electric strength of the gaps will be sufficient to prevent the occurrence of discharges within them. The shield 14 is provided with a terminal 15 for connecting external voltage dividers (not shown in the drawing). The terminal 15 is isolated from the cathode casing 1 by means of an insulator 16.

For normal operation of the gas-discharge switching device the dimensions of the cathode (i.e., the diameter $a$, in centimeters, of the chamber (FIG. 2) and the distance $d$, in centimeters, of the anode to the barrier), as well as the pressure $p$, in mm Hg, within the chamber must comply with the following requirements:

$pd$ (pd)min for conformity with the values of the left-hand branch of Paschen's curve;

$a \cdot p - 1$ for obtaining the hollow cathode effect.

The first requirement determines the electric strength of the interelectrode gaps of the gas-discharge switching device for the selected values of $p$ and $d$.

The second requirement provides for a relatively low firing voltage of the arc discharge within the discharge chambers 3 at a positive polarity of the anodes 4 of the gas-discharge switching device.

The gas-discharge switching device operates in the following manner.

Figure 2:
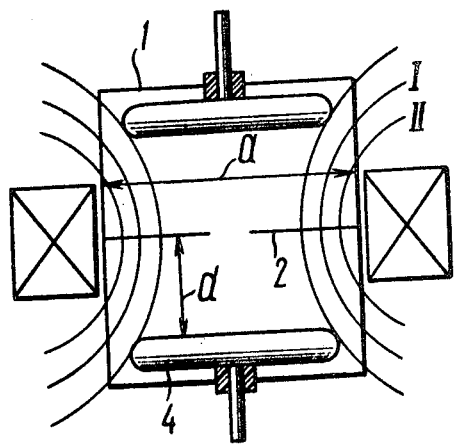
FIG. 2 shows the shape of the impulse magnetic field within the discharge chamber.
Figure 3:
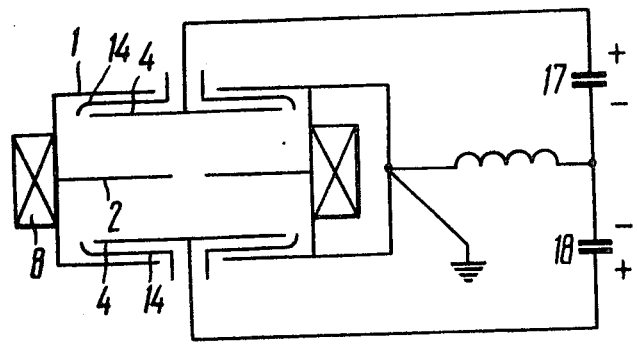
FIG. 3 shows the connection diagram of the hereindescribed gas-discharge switching device and the oscillatory circuit.

The pressure within the discharge chambers 3 (FIG. 1) is set so as the meet the above-stipulated first requirement. In order to fire the gas-discharge switching device connected to the oscillatory circuit with a sectionalized capacitor battery made up of capacitors 17 and 18, it is necessary to supply a current pulse from a 150 to 300 V source of direct current to the solenoid 8. The resulting field set up within the discharge chambers is of such a shape that the magnetic lines of force thread twice through the cathode in each discharge gap without passing through the anode 4 (FIG. 2). On application of a positive voltage to the anodes 4, the intersection of the electric and magnetic lines of force within the discharge gaps produces a potential traps inside which the electrons are subject to an oscillatory motion along the magnetic lines of force and, at the same time, drift along the axis of the anode-cathode systems. Moving for a sufficiently long period of time, these electrons ionize the gas under conditions at which the length of their free path is much greater than the length of the discharge gap. The ionization produces a discharge simultaneously in both discharge gaps. This is also promoted by the penetration of plasma from one of the discharge chambers 3 into the other one through the hole in the barrier 2 (FIG. 1). Measurements show that the spread of the firing time of the discharges produced within the discharge chambers is confined to 0.1 microsecond. The presence of two simultaneously operating discharge gaps within the gas-discharge switching device leads to a two-fold reduction in the inductance and resistance as compared with arc rectifiers of conventional design.

What is claimed is:

1. A gas-discharge switching device filled with gas under a pressure corresponding to the left-hand branch of Paschen's curve, comprising: a hollow cathode in the form of a closed chamber; a barrier dividing the above-mentioned chamber so as to form at least two discharge chambers; at least two anodes each of which is arranged within each of the discharge chambers obtained as a result of division by the above-mentioned barrier; a means for arc firing.

2. A gas-discharge switching device as claimed in claim 1, wherein the discharge chambers obtained as a result of division by the above-mentioned barrier communicate between each other.

* * * * *